US012687681B2

(12) United States Patent
Cheng et al.

(10) Patent No.: US 12,687,681 B2
(45) Date of Patent: *Jul. 21, 2026

(54) OPTICAL CONNECTOR WITH WINDOW AND CORRESPONDING CURING METHODS THEREOF

(71) Applicant: CORNING RESEARCH & DEVELOPMENT CORPORATION, Corning, NY (US)

(72) Inventors: Xiaole Cheng, Painted Post, NY (US); Joel Christopher Rosson, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 265 days.

This patent is subject to a terminal disclaimer.

(21) Appl. No.: 17/956,219

(22) Filed: Sep. 29, 2022

(65) Prior Publication Data

US 2023/0110703 A1      Apr. 13, 2023

Related U.S. Application Data

(60) Provisional application No. 63/253,147, filed on Oct. 7, 2021.

(51) Int. Cl.
*G02B 6/38* (2006.01)

(52) U.S. Cl.
CPC ................................... *G02B 6/3861* (2013.01)

(58) Field of Classification Search
CPC ............................... G02B 6/3861; G02B 6/381
See application file for complete search history.

(56) References Cited

U.S. PATENT DOCUMENTS

| | | | |
|---|---|---|---|
| 6,331,080 B1 * | 12/2001 | Cole | C09J 11/06 |
| | | | 385/80 |
| 6,565,262 B2 | 5/2003 | Childers et al. | |
| 9,690,055 B2 | 6/2017 | Wu | |
| 10,393,957 B1 * | 8/2019 | Potter | G02B 6/0006 |

(Continued)

FOREIGN PATENT DOCUMENTS

| | | | |
|---|---|---|---|
| JP | 2001318266 A | * | 11/2001 |
| WO | 2020/145011 A1 | | 7/2020 |

*Primary Examiner* — Abbas Rashid
*Assistant Examiner* — Caroline Beha
(74) *Attorney, Agent, or Firm* — Kapil U. Banakar

(57) ABSTRACT

The present disclosure relates to a connector assembly and a corresponding method to cure bonding agent or adhesive in the connector assembly with light source(s) and without the addition of heat. Disclosed herein are various embodiments of bonding agents for use in adhering optical fibers to ferrules within optical connectors, and the methods for use thereof. Various embodiments of the bonding agents disclosed herein may have other desirable properties for the process of securing an optical fiber within a ferrule, such as, but not limited to, shortened process cycle time. Embodiments herein address these needs by monitoring the change in refractive index of a photocurable bonding agent at the interface between the photocurable bonding agent and a substrate or optical fiber, which is referred to as "back reflectance." In particular, the methods described herein utilize back reflectance techniques to cure the photocurable material or bonding agent.

7 Claims, 16 Drawing Sheets

(56)                    References Cited

U.S. PATENT DOCUMENTS

| | | | |
|---|---|---|---|
| 10,928,595 B2 | 2/2021 | Rosson | |
| 2003/0081910 A1* | 5/2003 | Gimbel | G02B 6/25 |
| | | | 385/80 |
| 2003/0214571 A1* | 11/2003 | Ishikawa | G02B 26/0841 |
| | | | 347/255 |
| 2008/0226237 A1 | 9/2008 | O'Riorden et al. | |
| 2015/0362679 A1* | 12/2015 | Wu | B32B 37/142 |
| | | | 156/272.8 |
| 2017/0351037 A1* | 12/2017 | Watanabe | G02B 6/36 |
| 2018/0136418 A1* | 5/2018 | Butler | C03B 23/20 |
| 2021/0157062 A1* | 5/2021 | Bickham | G02B 6/3854 |
| 2022/0099900 A1 | 3/2022 | Dannoux et al. | |

* cited by examiner

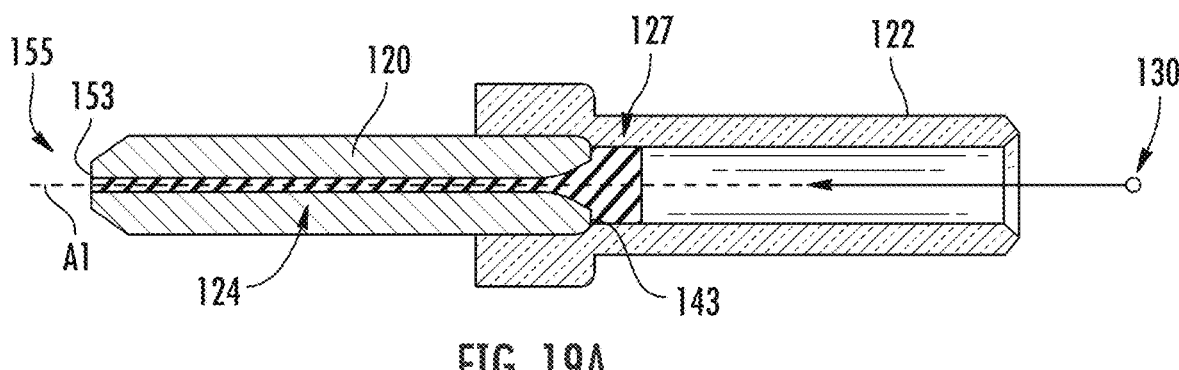
FIG. 19A
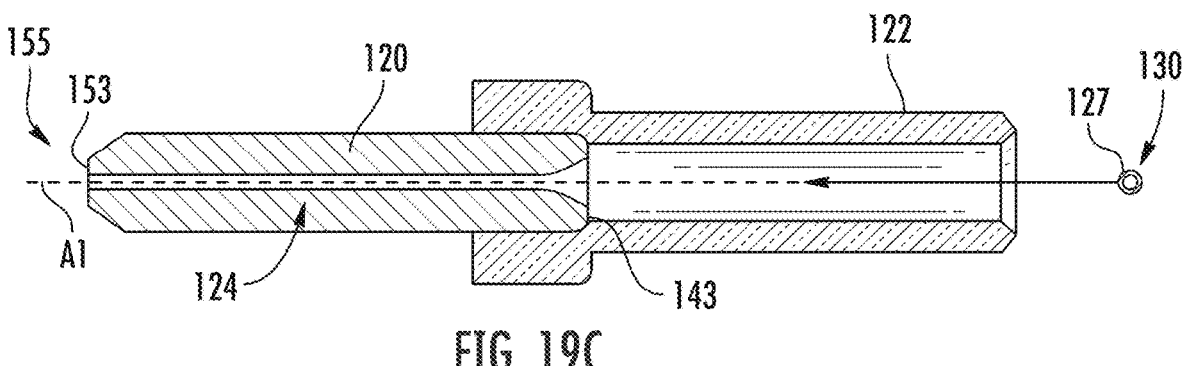
FIG. 19B
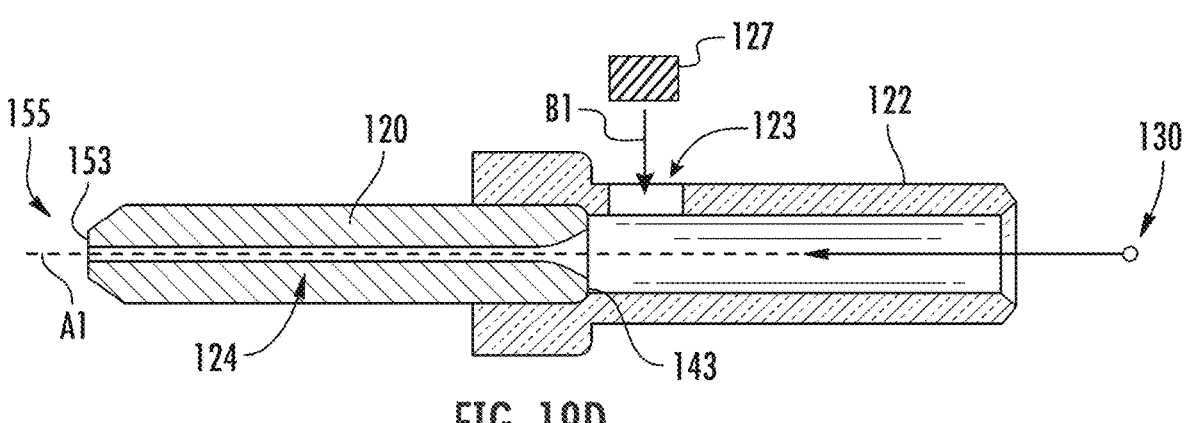
FIG. 19C
FIG. 19D

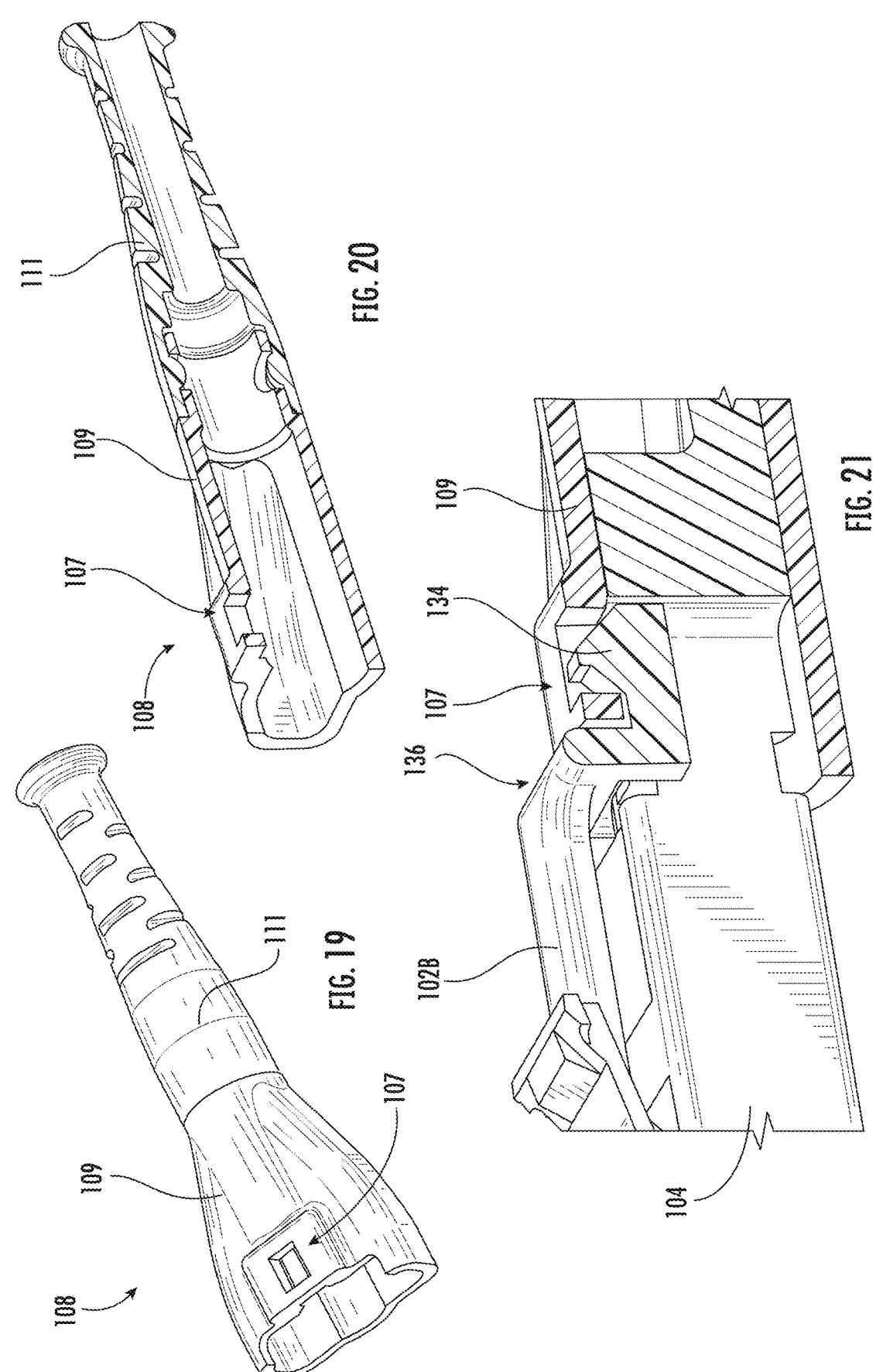

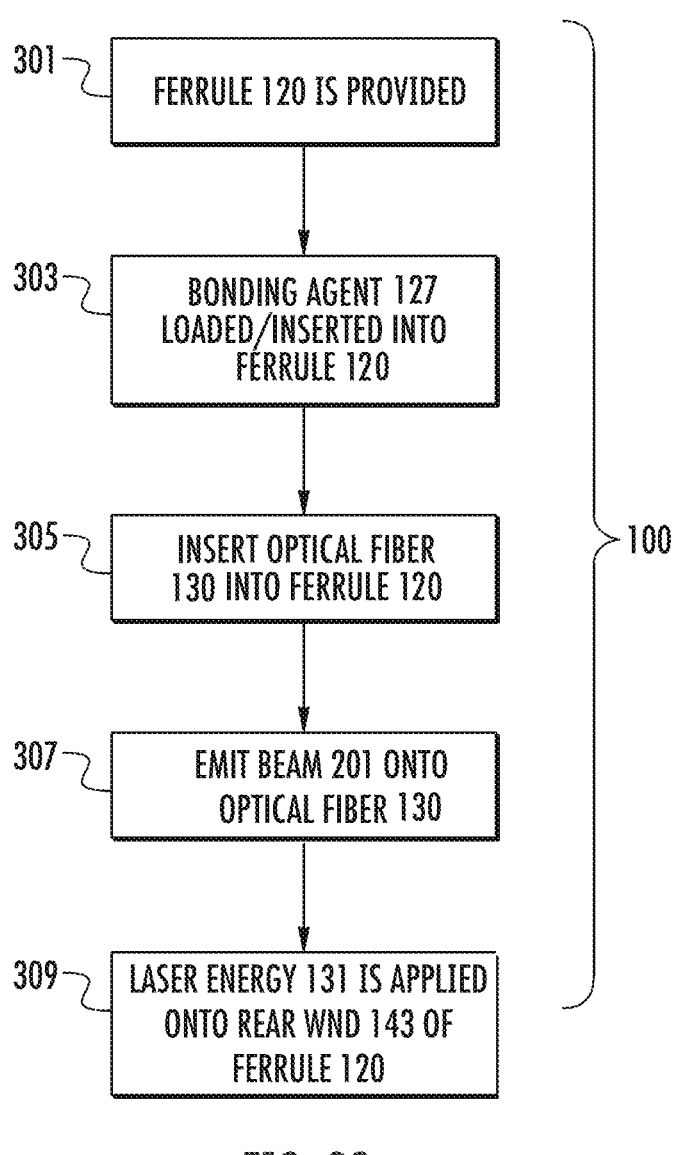
FIG. 23

OPTICAL CONNECTOR WITH WINDOW AND CORRESPONDING CURING METHODS THEREOF

PRIORITY APPLICATION

This application claims the benefit of priority of U.S. Provisional Application No. 63/253,147, filed on Oct. 7, 2021, the content of which is relied upon and incorporated herein by reference in its entirety.

FIELD OF THE DISCLOSURE

This disclosure relates to fiber-optic assemblies used in telecommunication systems, and in particular relates to duplex fiber optic connector assemblies and fiber optic cable assemblies permitting polarity reversal along with methods therefor.

BACKGROUND OF THE DISCLOSURE

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables.

The capabilities of optical fiber, optical cable and fiber optic hardware continuously improve through research and innovation to meet the demands of increasing numbers of users. This is creating issues of density within even the most spacious data centers. As data centers become more densely configured one area of concern is cabling and airflow. Each piece of equipment within the data center is interconnected to other equipment or to different components within the same cabinet using jumper cables. Jumper cable assemblies typically comprise single fiber connectors and cables, i.e., simplex cable assemblies, usually arranged into sets of two, one input and one output. Large numbers of jumper cable assemblies bunched together are an impediment to maximized air flow, creating blockages and decreasing cooling efficiency in the data center, which can in turn affect performance. One method of mitigating this issue is to integrate the standard two-cable duplex cable assembly into a single cable duplex jumper, reducing by half the number of cables required to service a given data center. While this does indeed decrease the total cable count and serve the intended purpose of improving air flow, there are other issues that arise.

Most duplex and multi-fiber cable assemblies used in data centers follow a polarity scheme established by Addendum 7 to ANSI/TIA/EIA/568B.1, Guidelines for Maintaining Polarity Using Array Connectors ('568B.1-A7). Polarity for duplex jumpers is typically either dedicated A-to-B or A-to-A, depending upon the application. Harnesses that break out array connectors, such as Multi-fiber Push-On (MPO) or the like, from multi-fiber into single or double fiber cables with simplex or duplex connectors also follow the standards of polarity spelled out in '568B.1-A7. The craft can correct polarity miscues in typical duplex connector assemblies by disassembling and reassembling them into the preferred orientation. U.S. Pat. No. 6,565,262 discloses a duplex connector cable assembly employing a clip to secure two simplex connector cable assemblies together. It is obvious to one skilled in the art that the clip can be removed and the duplex connector cable assembly then reassembled into a different polarity configuration. However, the '262 patent does nothing to address the aforementioned cable crowding. U.S. Pat. App. No. 2008/0226237 discloses a duplex connector cable assembly with a single cable that addresses cable crowding issues, but does not address reversing the polarity. Thus, there is an unresolved need for a single cable, duplex connector cable assembly with the capability of polarity reversal in a quick, easy and reliable manner.

SUMMARY OF THE DISCLOSURE

In general, the present disclosure relates to a connector assembly and a corresponding method to cure bonding agent or adhesive in the connector assembly with light source(s) and without the addition of heat. Disclosed herein are various embodiments of bonding agents for use in adhering optical fibers to ferrules within optical connectors, and the methods for use thereof. Various embodiments of the bonding agents disclosed herein may have other desirable properties for the process of securing an optical fiber within a ferrule, such as, but not limited to, shortened process cycle time. Embodiments herein address these needs by utilizing the change in refractive index of a photocurable bonding agent at the interface between the photocurable bonding agent and a substrate or optical fiber, which is referred to as "back reflectance." In particular, the methods described herein utilize back reflectance techniques to cure the photocurable material or bonding agent.

In one embodiment, a method of assembling an optical fiber assembly, wherein the optical fiber assembly includes a ferrule assembly comprising a ferrule coupled to a ferrule holder, the ferrule having a front end, a rear end, and a ferrule bore extending between the front and rear ends is provided. The method comprising: disposing a bonding agent into the ferrule bore; wherein the bonding agent has a viscosity ranging between 100 cP and 10000 cP at a temperature of about 25° C. and a reference curing time of less than 1 minute; inserting an optical fiber into the ferrule bore and through the bonding agent, wherein at least some of the bonding agent surrounds the optical fiber proximate the rear end of the ferrule holder; emitting a laser beam through a window of the ferrule holder and onto the bonding agent proximate the rear end of the ferrule; and emitting a light onto the optical fiber, wherein emitting the light and emitting the laser beam cause between 75% and 85% of the bonding agent in the ferrule to cure and thereby form the optical fiber assembly.

In another embodiment, the emitting a laser beam step is conducted simultaneously with the emitting a light step. In another embodiment, the emitting steps cause the between 75% and 85% of the bonding agent to cure in about 5 seconds or less. In another embodiment, the emitting a light step includes using a laser emitting a beam at a power ranging between 100 mW and 1000 mW and a wavelength of ranging between 300 nm and 450 nm. In another embodiment, the emitting a light step includes using a laser apparatus to emit a beam, the laser apparatus comprising: a laser having a power output ranging between 100 mW and 1000 mW and a wavelength ranging between 300 nm and 450 nm; a plurality of lenses directing the beam emitted by the laser onto the optical fiber inserted into the ferrule. In another embodiment, the laser apparatus further includes a glass stopper spaced apart from an end face of the ferrule by a spacing distance ranging between 0.1 mm and 2 mm. In another embodiment, the optical fiber assembly is part of a population of optical fiber assemblies formed by the same steps, and wherein the population of optical fiber assemblies has a mean insertion loss of less than or equal to 0.25 dB at a reference wavelength of 1310 nm. In another embodiment, the optical fiber comprises a cladding having a refractive index, wherein the bonding agent has a refractive index, and wherein a difference between the refractive index of the bonding agent and the refractive index of the cladding is between 0.04 and 0.12. In another embodiment, the difference between the refractive index of the bonding agent and the refractive index of the cladding is between 0.04 and 0.10. In another embodiment, the emitting a light step includes emitting a beam having a wavelength of ranging between 300 nm and 450 nm.

In one embodiment, an optical fiber assembly is provided. The optical fiber assembly formed by: disposing a bonding agent in a ferrule bore of a ferrule, wherein the bonding agent has a viscosity ranging between 100 cP and 10000 cP at a temperature of about 25° C.; inserting an optical fiber into the ferrule bore and through the bonding agent; emitting a light onto the optical fiber; and emitting a laser through a window of a ferrule holder coupled to the ferrule and onto the bonding agent proximate a rear end of the ferrule; wherein the emitting steps cause at least 80% of the bonding agent that is in the ferrule to cure in a curing time of less than 1 minute and thereby secure the optical fiber to the ferrule. In another embodiment, the emitting steps are conducted simultaneously. In another embodiment, the emitting steps cause the at least 80% of the bonding agent to cure in about 5 seconds. In another embodiment, the emitting a light step includes using a laser emitting a beam, the laser having a power ranging between 100 mW and 1000 mW and a wavelength of ranging between 300 nm and 450 nm. In another embodiment, the emitting a light step includes using a laser apparatus to emit a beam, the laser apparatus comprising: a laser having a power output ranging between 100 mW and 1000 mW and a wavelength ranging between 300 nm and 450 nm; a plurality of lenses directing the beam emitted by the laser onto the optical fiber inserted into the ferrule. In another embodiment, the laser apparatus further includes a glass stopper spaced apart from an end face of the ferrule by a spacing distance ranging between 0.1 mm and 2 mm. In another embodiment, the optical fiber assembly is part of a population of optical fiber assemblies formed by the same steps, and wherein the population of optical fiber assemblies has a mean insertion loss of less than or equal to 0.25 dB at a reference wavelength of 1310 nm. In another embodiment, the optical fiber comprises a cladding having a refractive index, wherein the bonding agent has a refractive index; wherein a difference between the refractive index of the bonding agent and the refractive index of the cladding is between 0.04 and 0.12. In another embodiment, the difference between the refractive index of the bonding agent and the refractive index of the cladding is between 0.04 and 0.10. In another embodiment, disposing the bonding agent includes inserting the bonding agent through the window of the ferrule holder.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 19 is a perspective view of a boot assembly of the connector assembly of FIG. 3;

FIGS. 19A-19D are cross-sectional views of the ferrule and a ferrule holder with an optical fiber illustrating the locations of a bonding agent;

FIG. 20 is a sectional view of the boot assembly of FIG. 19;

FIG. 21 is a sectional view of the boot assembly, the latch, and the connector base body illustrating how the latch and the boot assembly are coupled;

FIG. 23 is a flowchart illustrating a method of assembling a fiber optic connector assembly;

DETAILED DESCRIPTION

Figure 1:
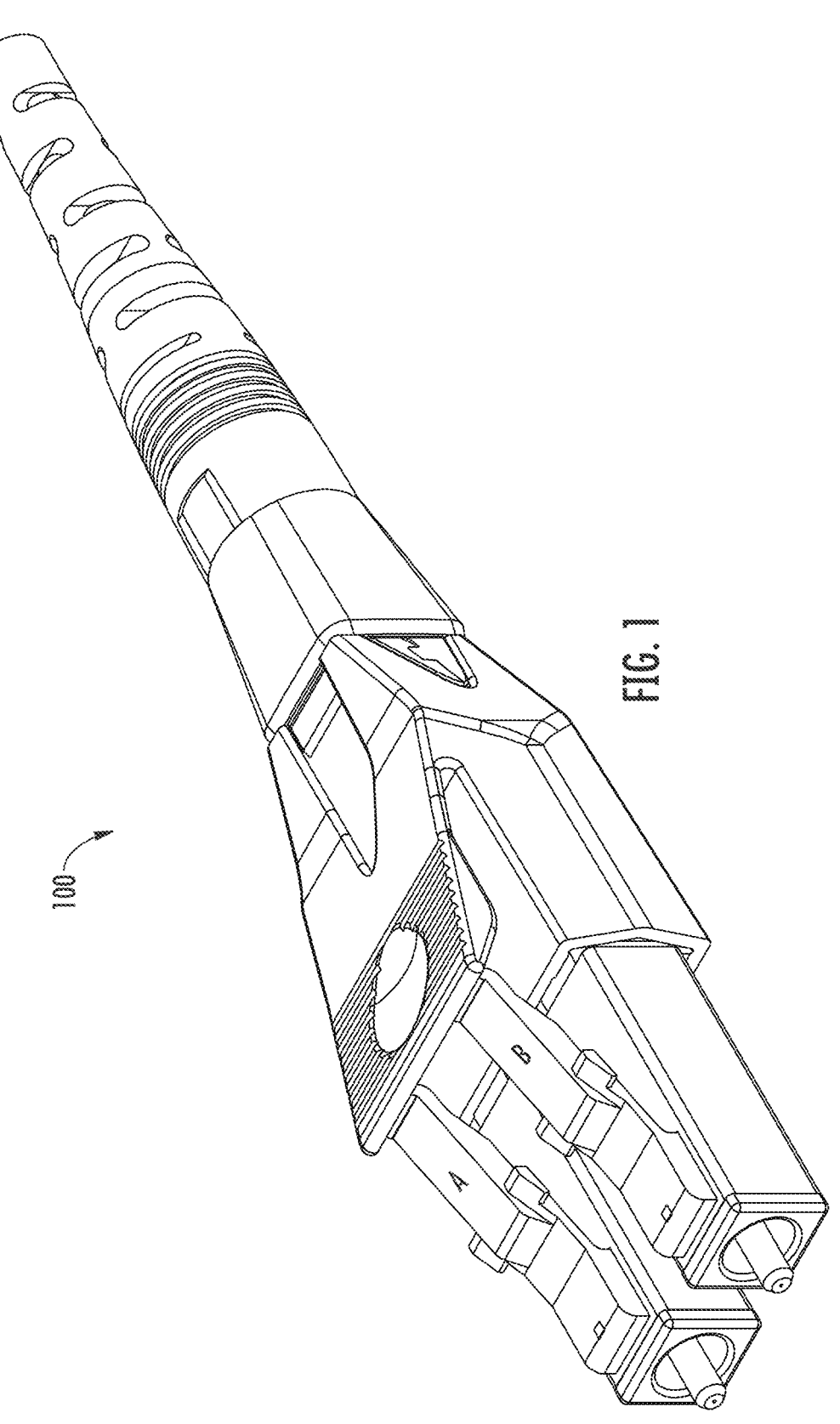
FIG. 1 a perspective view of a fiber optic connector.

Various embodiments will be clarified by examples in the description below. In general, the present disclosure relates to a connector assembly and a corresponding method to cure bonding agent or adhesive in the connector assembly with light source(s) and without the addition of heat. Disclosed herein are various embodiments of bonding agents for use in adhering optical fibers to ferrules within optical connectors, and the methods for use thereof. Various embodiments of the bonding agents disclosed herein may have other desirable properties for the process of securing an optical fiber within a ferrule, such as, but not limited to, shortened process cycle time. Embodiments herein address these needs by utilizing the change in refractive index of a photocurable bonding agent at the interface between the photocurable bonding agent and a substrate or optical fiber, which is referred to as "back reflectance." In particular, the methods described herein utilize back reflectance techniques to cure the photocurable material or bonding agent.

In this disclosure, the term "optical fiber assembly" refers to an assembly that includes a ferrule secured to at least one optical fiber. Additional components may be included as part of the assembly, but are not necessarily required unless explicitly stated in the claims that follow this detailed description. Additionally, the terms "assembly" and "sub-assembly" are considered to be interchangeable as the context requires. That is, reference to an "assembly" does not preclude that assembly being used as a sub-assembly for another article or apparatus (e.g., as alluded to above, an optical fiber assembly may be a sub-assembly for a cable assembly).

Also in this disclosure, the term "fiber optic connector" refers to an assembly that includes a ferrule and a connector body, with the ferrule intended to facilitate the alignment of optical fibers for optical coupling, and with the connector body intended to facilitate mechanical coupling (e.g., to an adapter). Other components may be included as part of such an assembly, but are not necessarily required unless explicitly stated in the claims that follow this detailed description. The terms "connector assembly", "connector sub-assembly", "optical connector", and "connector" are considered to be interchangeable with "fiber optic connector" in this disclosure.

Also in this disclosure, the term "curing time" refers to the time it takes from the initiation of curing reaction for the curable adhesive composition to achieve about 80% of its ultimate load capacity or strength under substantially dry conditions, with ambient temperature at about 25° C. Thus, curing times that are stated as a characteristic of the adhesive composition are based on a reference temperature of about 25° C. (ambient conditions). In this regard, "curing time" may be considered as a "reference curing time" unless otherwise clear from context. An actual cure time may be different than the reference curing time if there are different conditions (e.g., different temperatures) under which the curing reaction occurs.

Likewise, in this disclosure, a curable adhesive composition is considered to be "cured" when the adhesive composition achieves about 80% of its ultimate load capacity or strength under substantially dry conditions.

Also in this disclosure, the term "back reflectance" refers to light reflected from a surface of a photocurable material or bonding agent. In one embodiment, back reflection refers to light or beam reflected from an interface between a photocurable material or bonding agent and an optical fiber.

In this disclosure, the term "degree of cure" refers to the percentage of the entire curable adhesive that has completed the curing reaction for the curable adhesive. Therefore, "degree of cure" is intended to be used interchangeably with "percentage of adhesive cured" or "percentage cured."

One example of a fiber optic connector (also referred to as "optical connector 101", or simply "connector 101") for such a cable assembly is shown in FIG. 1. Although the connector 101 is shown in the form of a LC-type connector (e.g., according to IEC 61754-4), the methods described below may be applicable to processes involving different fiber optic connector designs. This includes LC, SN and MDC (according to the QSFP-DD Multi-Source Agreement (MSA) Hardware Specification, Rev. 6.0, 2021, and the relevant documents cross-referenced therein), and MPO-type connectors, for example, and other single-fiber or multi-fiber connector designs. A general overview of the connector 101 will be provided simply to facilitate discussion.

Figure 2:
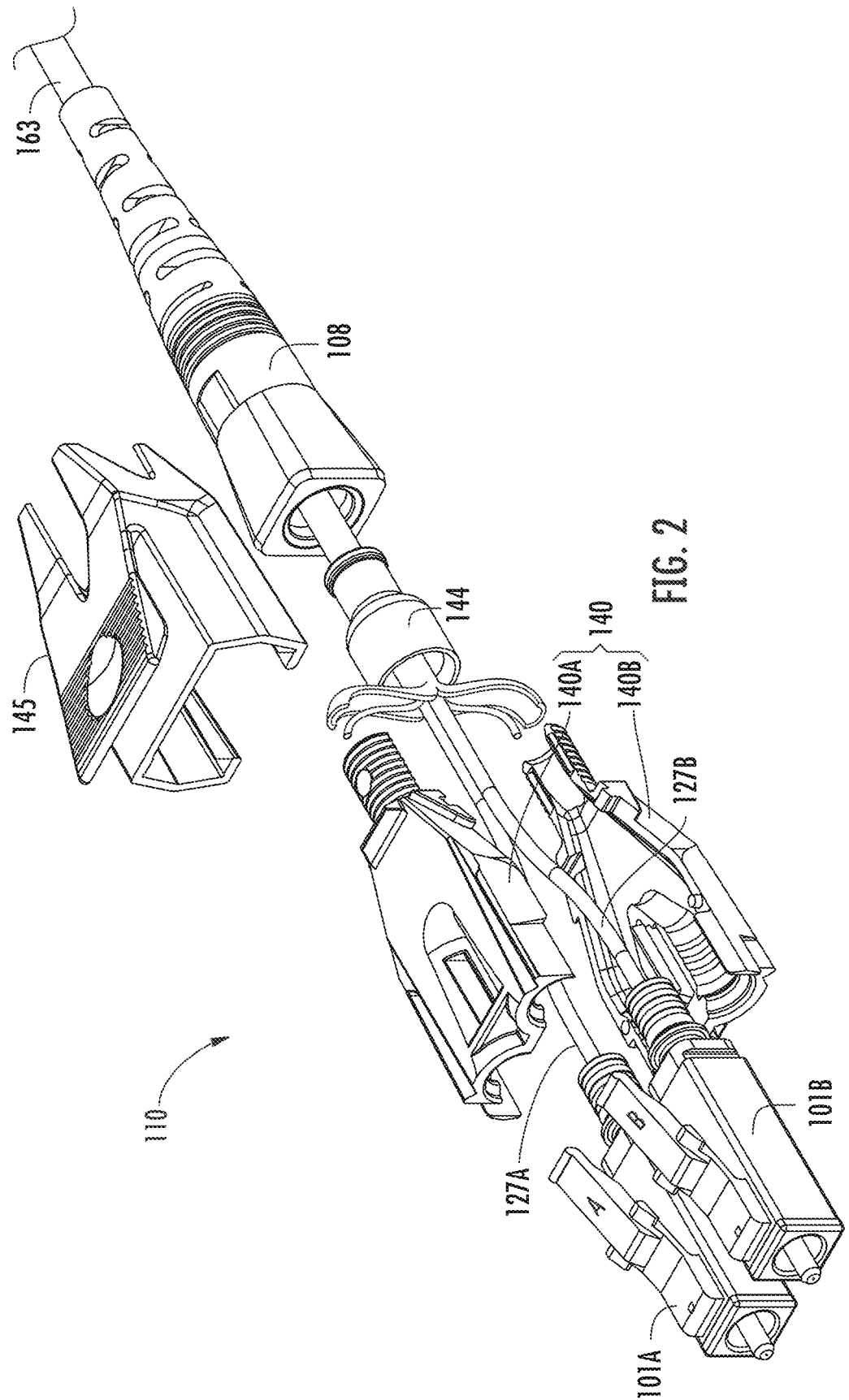
FIG. 2 is an exploded perspective view the fiber optic connector of FIG. 1.

FIG. 1 shows one explanatory embodiment of a duplex fiber optic connector assembly 100 suitable for in situ polarity reversal. FIG. 2 shows a partially exploded view of duplex fiber optic connector assembly 100 as a portion of a duplex fiber optic cable assembly 101. The duplex fiber optic cable assembly 101 includes a first fiber optic connector assembly 101A, a second fiber optic connector assembly 101B, a housing 140 for receiving the first and second fiber optic connector assemblies 101A and 101B. The first and second fiber optic connector assemblies 101A and 101B may independently rotate along their respective longitudinal axes for polarity reversal within housing 140. As shown, connector assemblies 101A and 101B are attached to optical fibers 127A and 127B issuing from a fiber optic cable 163. The fiber optic cable 163 may be any suitable fiber optic cable or cables. By way of example, the fiber optic cable may include two unbuffered optical fibers generally surrounded by one or more strength elements and a cable jacket: however, other variations of the fiber optic cable may include buffered optical fibers and/or eliminate the strength elements or jacket. In this embodiment, fiber optic cable 163 is secured to the housing 140 by a crimp band 144 and a boot 108 fits over a portion of fiber optic cable 163 and the crimp band 144 until it abuts the housing 140. Of course, other variations of the fiber optic connector are possible that allow independent rotation of the fiber optic connector assemblies within the housing. For instance, the fiber optic cable may have other crimp arrangements and/or use an epoxy or adhesive to secure the same to the fiber optic connector. In other embodiments, tubing may be positioned about optical fibers 127A and 127B within the housing 140, thereby providing bend control for inhibiting optical attenuation.

As depicted, a removable trigger mechanism 145 fits over the boot 108 and cable 163 and slides forward to engage the housing 140 and latch mechanisms on the respective first fiber optic connector assembly 101A and second fiber optic connector assembly 101B. The trigger mechanism 145 advantageously allows the craft to disengage both fiber optic connectors by pushing on a single trigger and also inhibits fiber optic cables from snagging on the connectors. The concepts disclosed herein may use any suitable simplex connector assembly for connector assemblies 101A and 101B, such as LC, SC, or other suitable configurations.

Optical Fiber Connector Assembly 100

Figure 3:
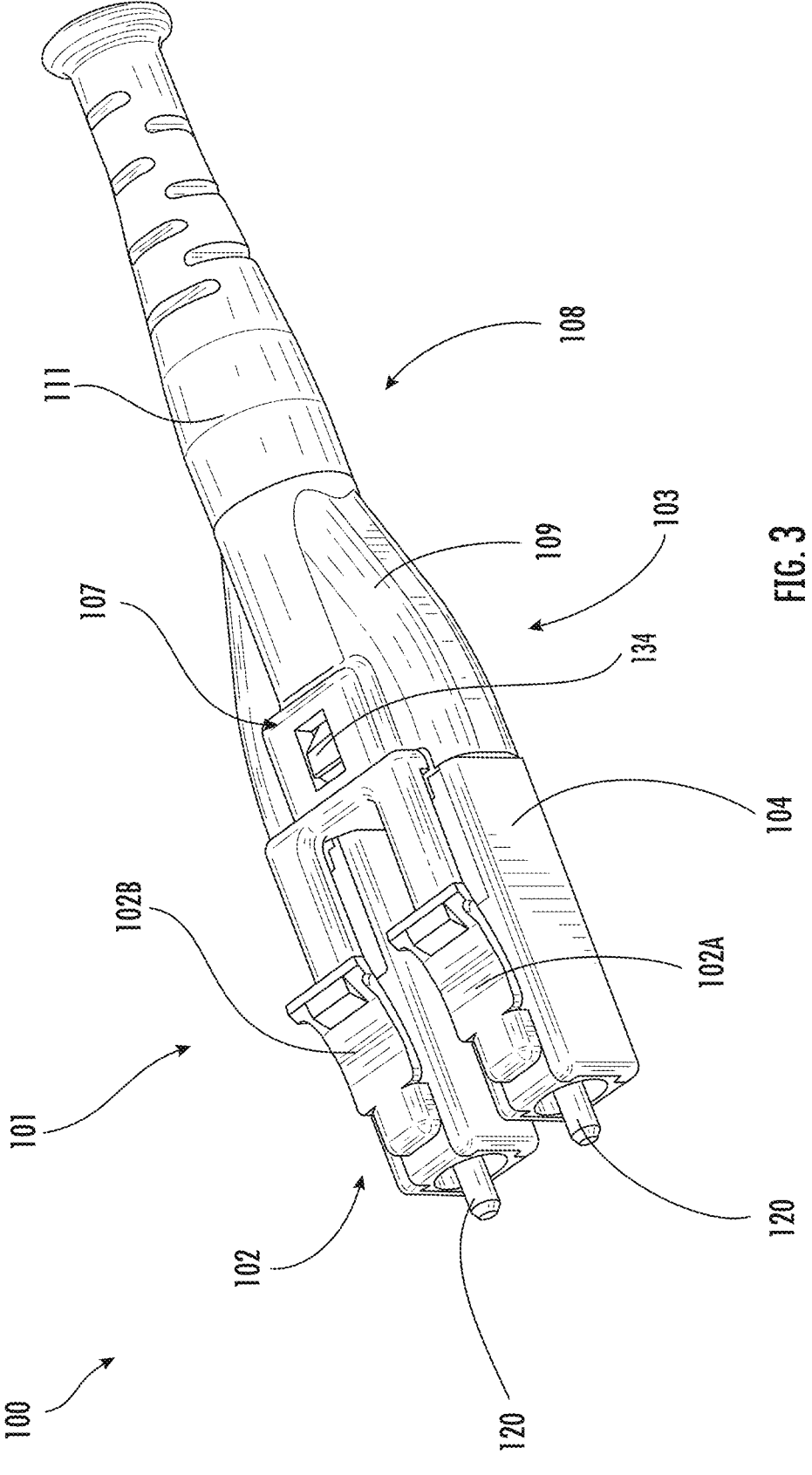
FIG. 3 is a perspective view of a connector assembly in accordance with the present disclosure.
Figure 4:
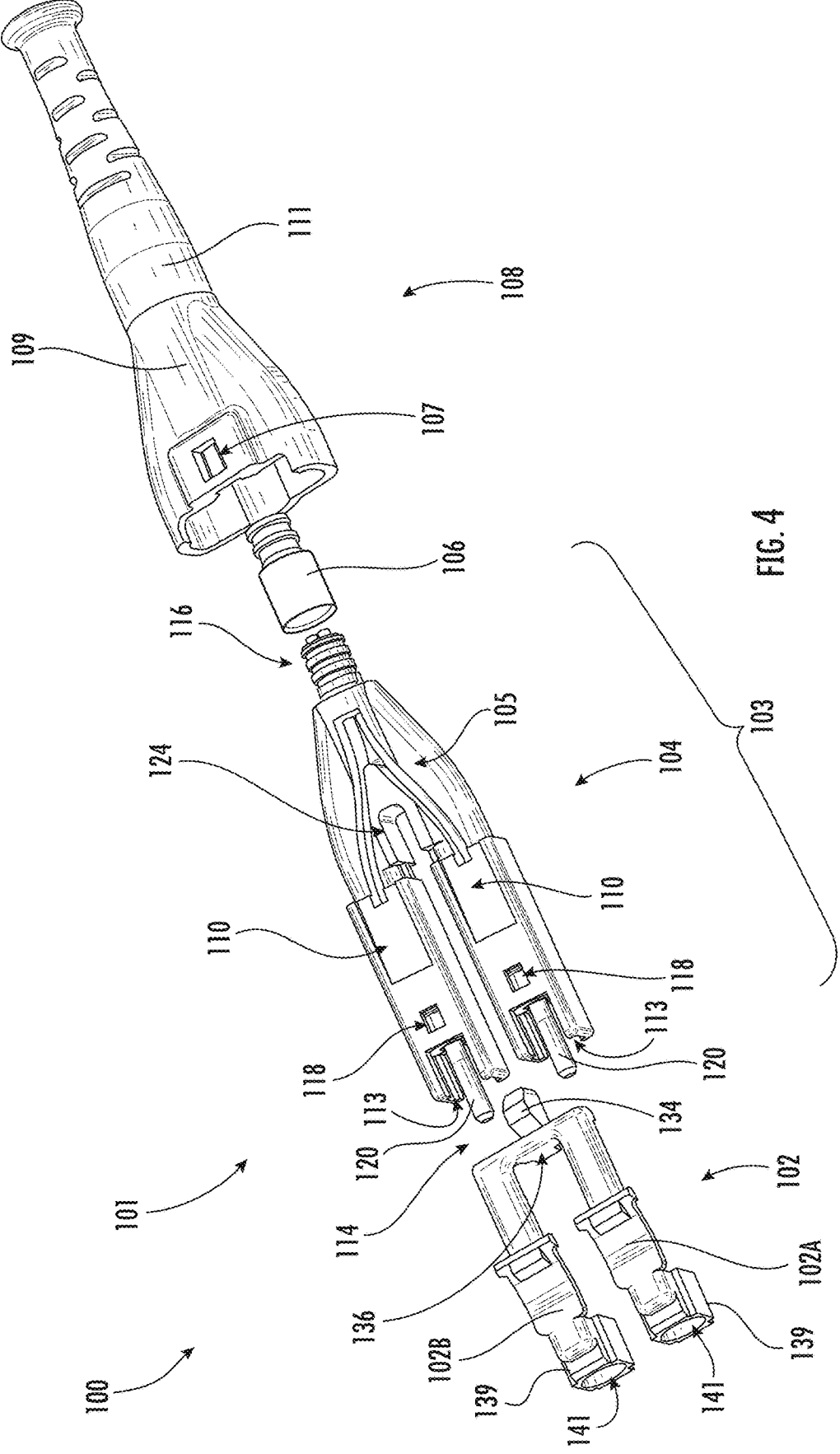
FIG. 4 is an exploded view of the connector assembly in FIG. 3.
Figures 5, 6, 7:
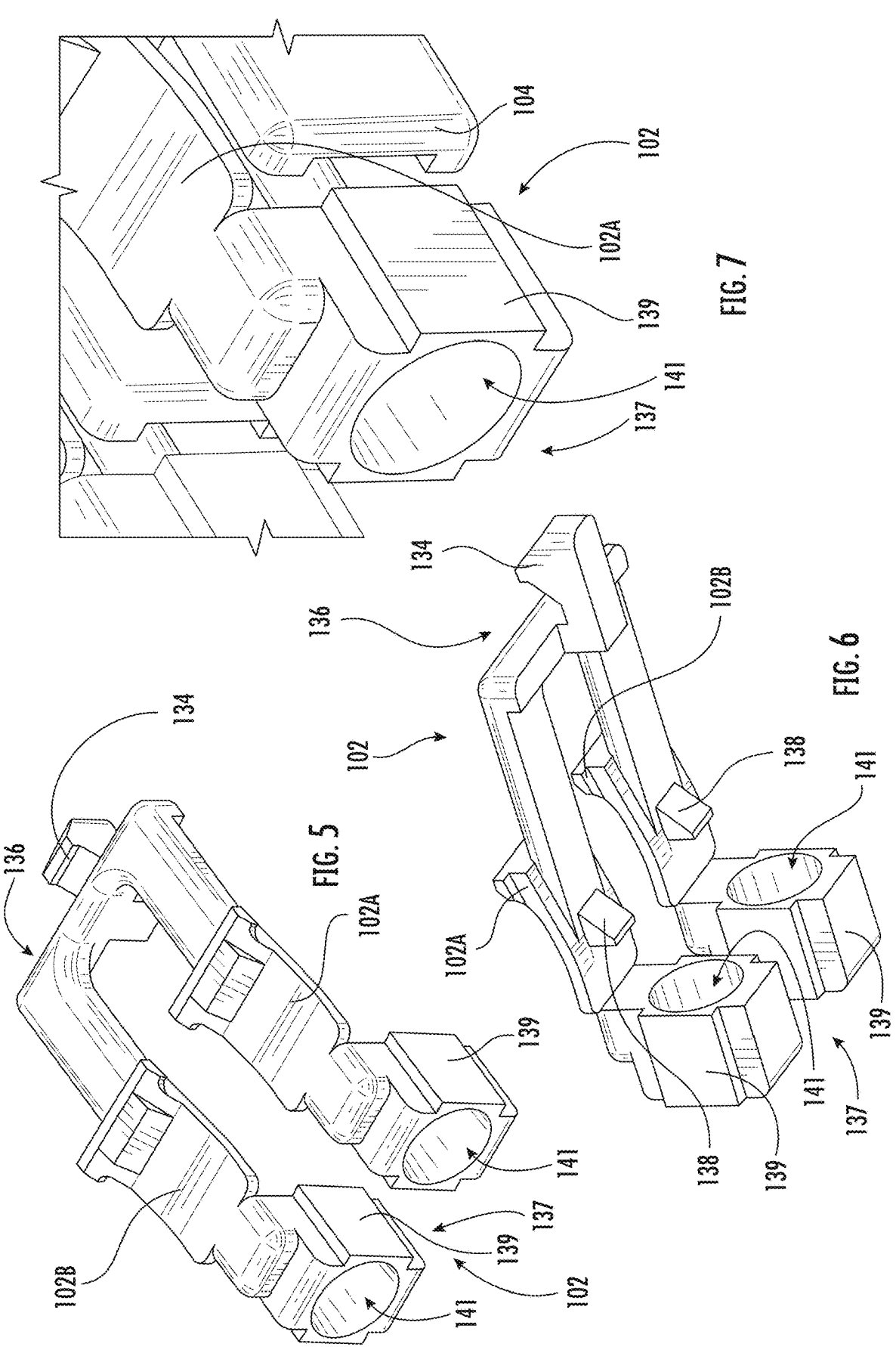
FIG. 5 is a perspective view of a latch of the connector assembly of FIG. 3.
FIG. 6 is a rear perspective view of the latch of FIG. 5.
FIG. 7 is an enlarged perspective view of the latch of FIG. 5.

Referring to FIGS. 3-4, various views of an optical fiber connector assembly 100 are shown. Optical fiber connector assembly 100 includes a connector 101 having a latch 102, connector subassembly 103, crimp band 106, and a boot assembly 108 each of which are coupled to each other to form optical fiber connector assembly 100.

Connector 101 is configured to terminate the end of an optical fiber. As shown, connector 101 is an LC duplex connector design, and as mentioned previously, although the connector 101 is shown in the form of a LC-type connector (e.g., according to IEC 61754-4), the methods described below may be applicable to processes involving different fiber optic connector designs. This includes SC, SN and MDC (according to the QSFP-DD Multi-Source Agreement (MSA) Hardware Specification, Rev. 6.0, 2021, and the relevant documents cross-referenced therein), and MPO-type connectors, for example, and other single-fiber or multi-fiber connector designs. Connector 101 mechanically couple and align cores of optical fibers so light can pass. As shown, connector 101 is a duplex connector. However, it is contemplated that in alternate embodiments, other suitable connectors may be used such as simplex connectors, for example.

Referring now to FIGS. 5-8, latch 102 is shown. Latch 102 is configured to assist in coupling optical fiber connector assembly 100 to relevant receiving structures (e.g., receiver modules, etc.). Latch 102 is coupled to connector base body 104 where front end 137 of latch 102 is received onto front end 114 of connector base body 104. In particular, front end 137 includes guide bodies 139 that extend from latch arms 102A, 102B as shown, and guide bodies 139 couple to front end 114 of connector base body 104 as discussed in greater detail below. As shown, guide bodies 139 are received into recess 113 of connector base body 104 at front end 114 of connector base body 104 such that guide bodies 139 contact front end 114 of connector base body 104 and are contoured to the shape of connector base body 104 at front end 114. Guide bodies 139 include apertures 141 that define and extend passages through which ferrules 120 extend when connector 101 is assembled (FIG. 3).

Figures 8, 9, 10:
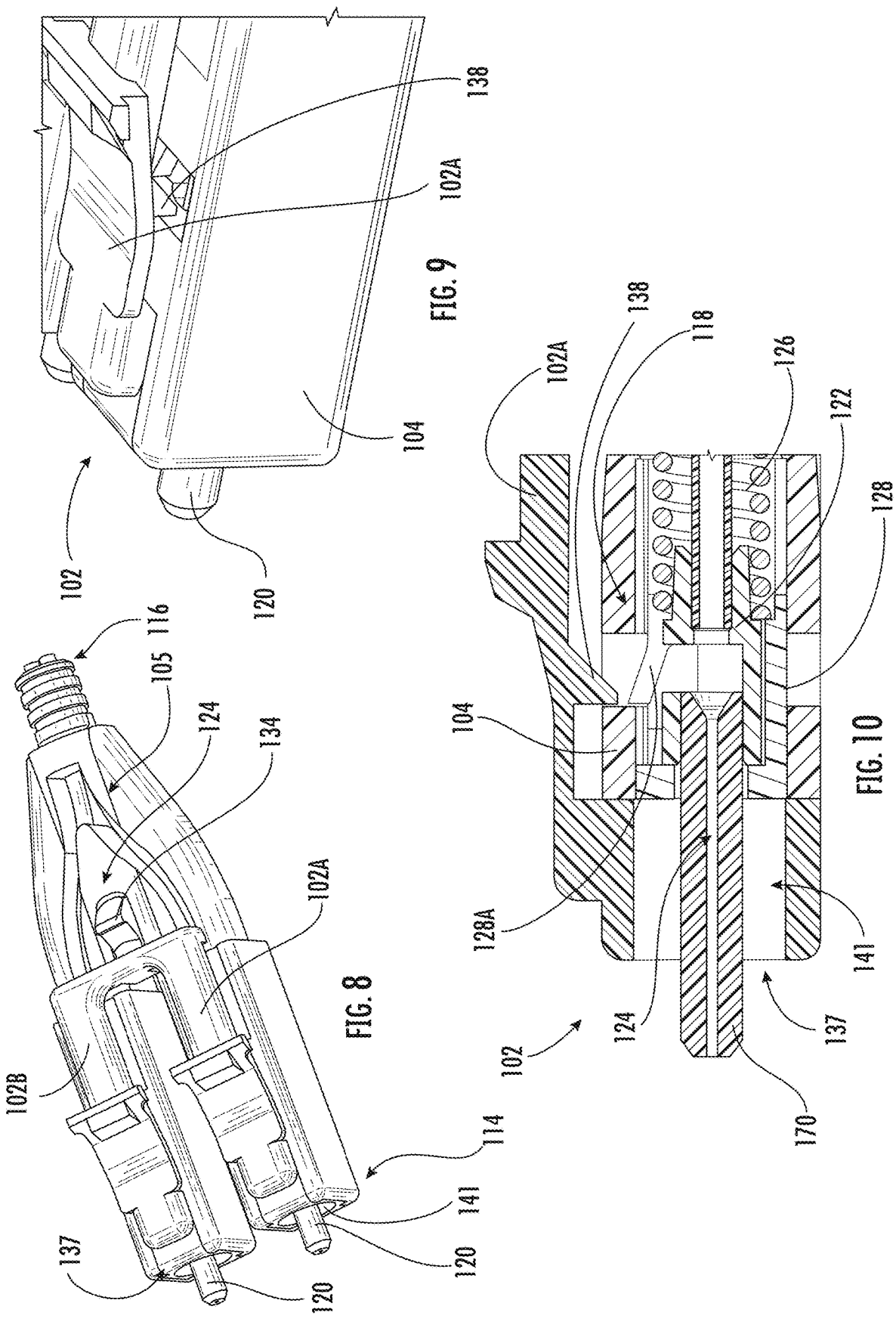
FIG. 8 is a perspective view of the latch of FIG. 5 assembled onto a connector base body of the connector assembly of FIG. 3.
FIG. 9 is an enlarged rear perspective view of the latch and the connector base body of FIG. 8.
FIG. 10 is a cross sectional view of the latch and the connector base body of FIGS. 8 and 9.

Latch 102 is also configured to reverse the polarity of the optical fiber connector assembly 100 as discussed in greater detail in U.S. Patent Application No. 63/155,461 filed on Mar. 2, 2021, the contents of which are herein incorporated by reference in its entirety. As shown in FIGS. 5-8, latch 102 includes latch arms 102A, 102B that are joined at a rear end 136 of latch 102 where the rear end 136 includes a rear protrusion 134. Latch arms 102A, 102B are generally parallel; however, it is within the scope of the present disclosure that in alternate embodiments, latch arms 102A, 102B are not parallel with each other. As also shown, each latch arm 102A, 102B includes a retention protrusion 138 that engages with connector base body 104 to couple latch 102 onto connector base body 104. Referring briefly to FIGS. 9 and 10, retention protrusion 138 extends into a window 118 of connector base body 104 and in turn, latches retention protrusion 138 into place on connector base body 104. It is within the scope of the present disclosure, that alternate coupling configurations of latch 102 and connector base body 104 may be used (e.g., frictional engagement, etc.). Additional details regarding installation and removal of latch 102 onto connector base body 104 are discussed in greater detail herein.

Rear protrusion 134 is configured to latch onto boot assembly 108 and provides additional security of latch 102 onto connector base body 104 of connector assembly 100.

In some embodiments, latch 102 is made of polymeric materials such as Ultem® 1000 as manufactured by SABIC and other suitable materials. However, in alternate embodiments, it is contemplated that other suitable materials may be used for latch 102.

Figures 11, 12:
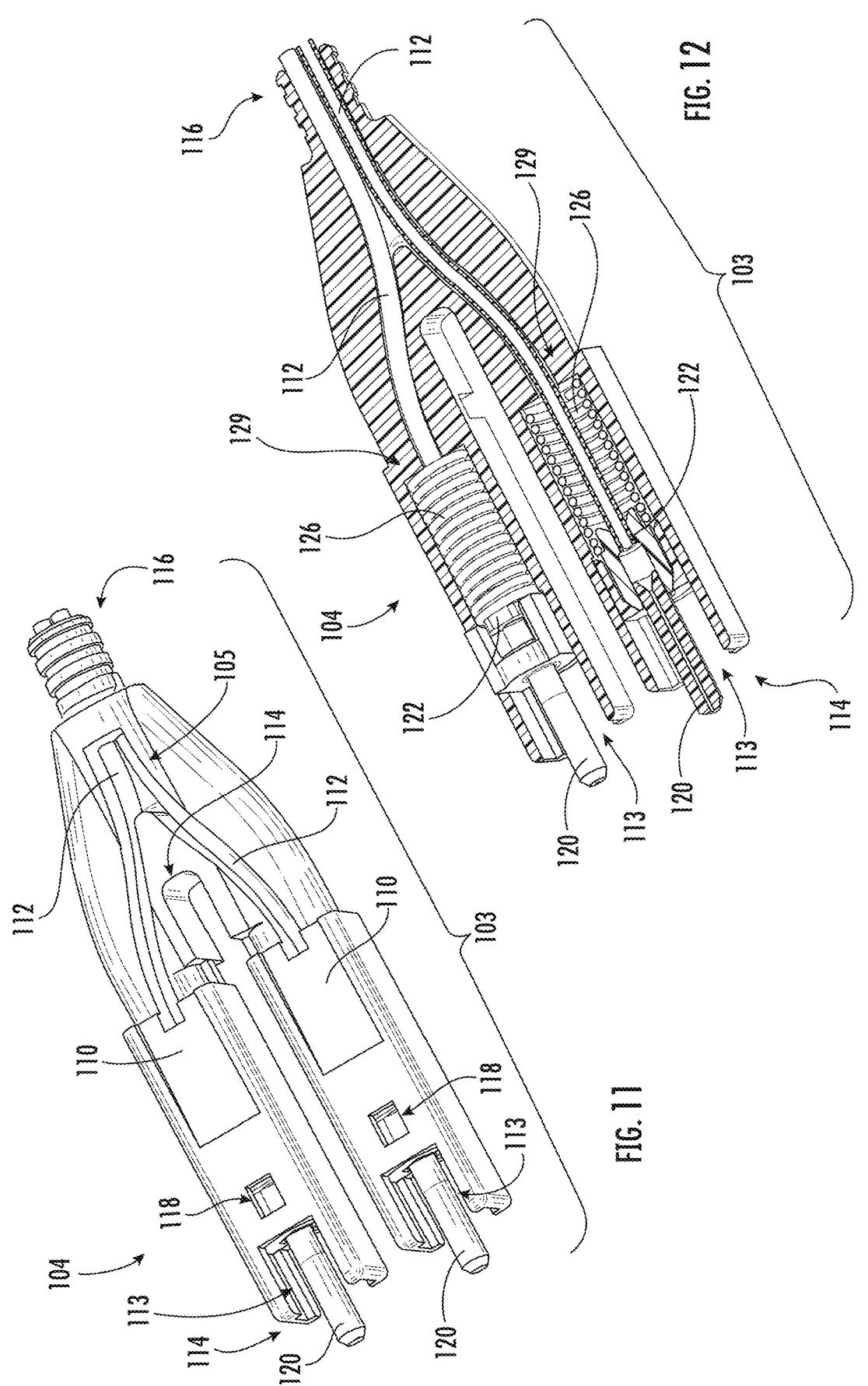
FIG. 11 is a perspective view of the connector base body of the connector assembly of FIG. 3.
FIG. 12 is a cross sectional perspective view of the connector base body of FIG. 11.

Referring now to FIGS. 11 and 12, connector sub-assembly 103 is shown. Connector subassembly 103 includes a connector base body 104, a ferrule 120, and a ferrule holder 122 where connector base body 104 is configured to receive ferrule 120 and ferrule holder 122. Also, as mentioned previously, latch 102 is received onto front end 114 of connector body 104. In particular, in some embodiments, connector base body 104 includes recesses 113 configured to receive guide bodies 139. As shown, connector base body 104 includes routing slots 105, cut outs 107, latch arm relief 110, window 118, front end 114, and rear end 116.

Routing slots 105 are configured to hold fiber guide tubes 112 and optical fiber 130, which is housed within fiber guide tube 112 which extends from a rear end portion of connector base body 104 to within ferrule holder 122 to help guide the insertion of optical fiber 130 (FIG. 18) via fiber guide tubes 112 into ferrule 120. Routing slots 105 lead to recess 129 which receives spring 126. Spring 126 is configured to interact with walls of connector base body 104 to bias ferrule holder 122 and ferrule 120. Cut out 107 is sized and configured to receive rear protrusion 134 of latch 102 such that rear protrusion can be coupled to boot assembly 108 as discussed in greater detail herein.

As mentioned previously, connector base body 104 includes latch arm relief 110. Latch arm relief 110 is configured to provide relief to latch arm 102 as applied by boot assembly 108 when removing boot assembly 108 from connector assembly 100 as discussed below.

Connector base body 104 includes a window 118 near front end 114. Window 118 is adjacent to latch arm relief 110 and provides access to optical fiber 130 as discussed in greater detail herein.

Figures 13, 14, 14A:
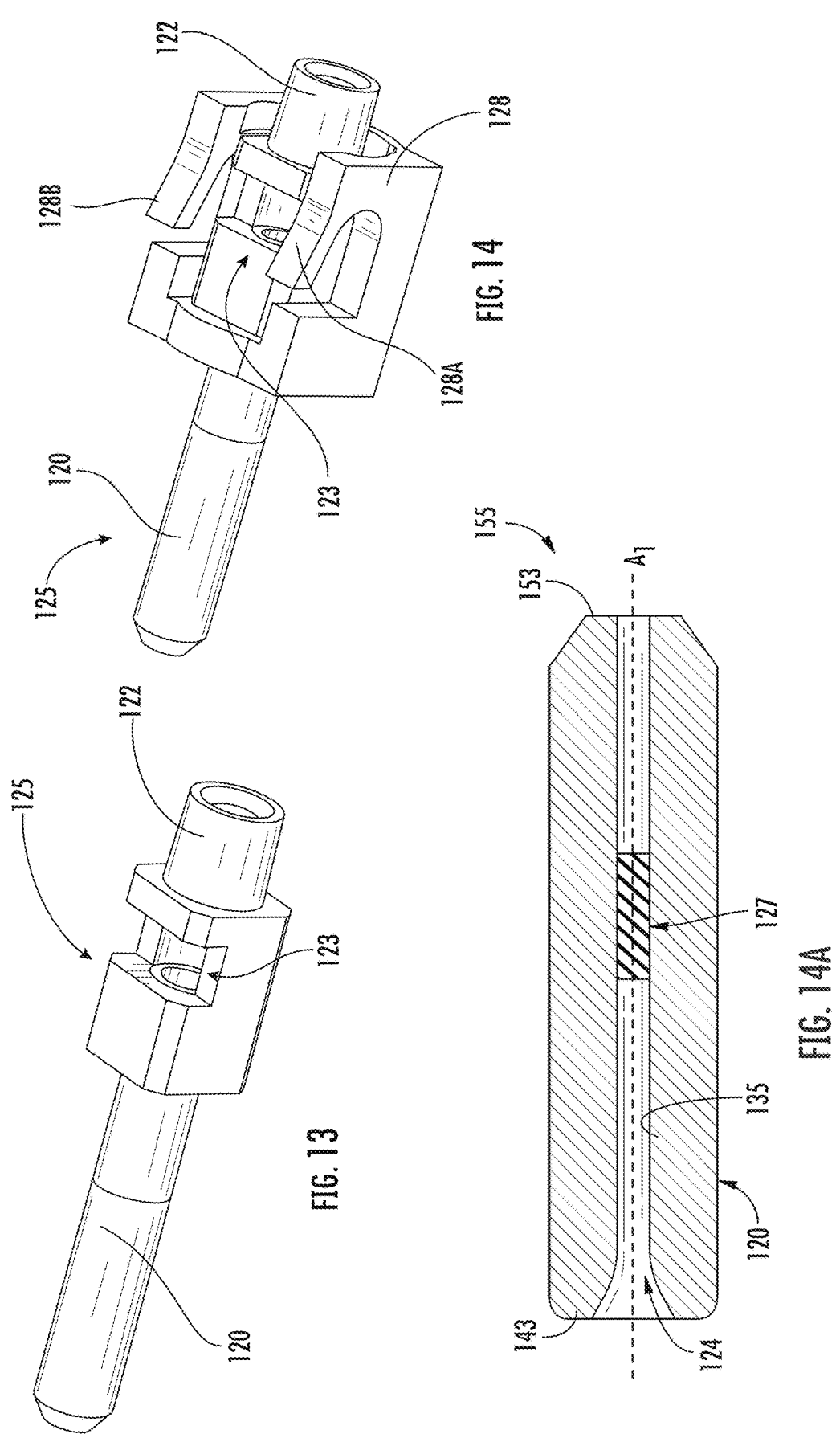
FIG. 13 is a perspective view of a ferrule assembly including a ferrule and a ferrule holder.
FIG. 14 is a perspective view of the ferrule assembly of FIG. 13 enclosed in a clip carrier.
FIG. 14A is a cross-sectional view of a ferrule and a bonding agent disposed in a ferrule bore of the ferrule of the fiber optic connector shown in FIG. 18.

Front end 114 of connector base body 104 is configured to receive ferrule 120 and ferrule holder 122, which collectively comprise a ferrule assembly 125. Referring now to FIGS. 13 and 14, ferrule assembly 125 is shown where ferrule 120 is received into ferrule holder 122. Referring now to FIG. 14A, an enlarged view of the ferrule 120 in isolation is shown. As shown, ferrule 120 is a standard ferrule where ferrule bore 124 has a substantially consistent diameter throughout a length of ferrule 120. However, it is within the scope of the present disclosure that alternate ferrules may be used, such as a counterbore ferrule or a ferrule 120 having ferrule bore 124 with varying diameters throughout the length of ferrule 120, for example. In general, the ferrule 120 includes a ferrule bore 124 extending between the front and rear ends 114, 116 along a longitudinal axis A1. The front and rear ends 114, 116 define respective front and rear end faces of the ferrule 120 that extend in planes parallel or substantially parallel to each other but substantially perpendicular to the longitudinal axis A1. In some embodiments, the front end face may be at a slight angle relative to the longitudinal axis A1 to provide, for example, an angled physical contact (APC) end face.

Figure 14B:
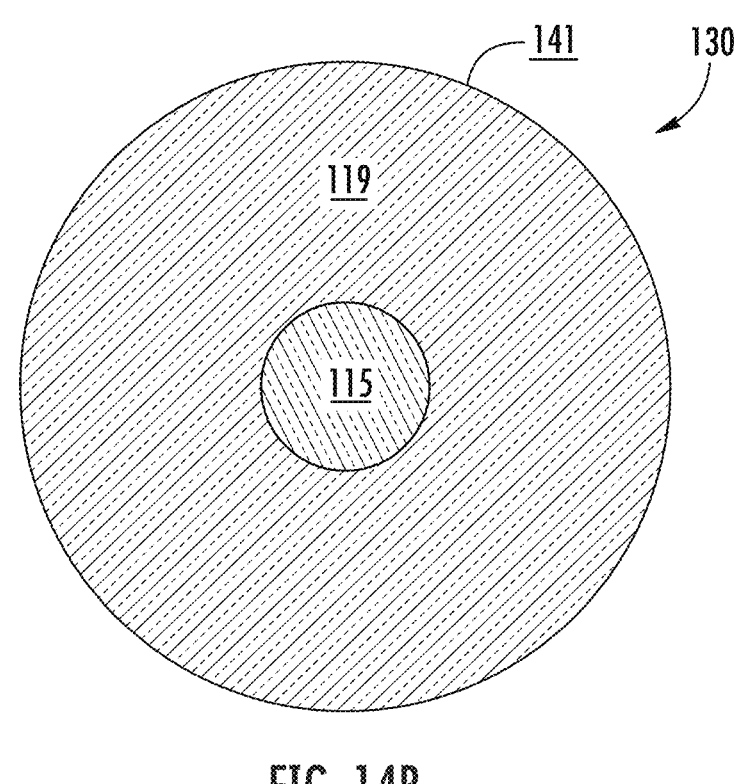
FIG. 14B is a cross-sectional view of an example optical fiber configured to be inserted into the ferrule of FIG. 18.

Ferrule 120 is intended to terminate an optical fiber 130, an example of which is shown in FIG. 14B. Optical fiber 130 is configured to be inserted into ferrule 120 and optical fiber connector assembly 100 is shown. Optical fiber 130 includes a core 115 and a cladding 119 surrounding core 115 to define an external surface 141 of optical fiber 130. Core 115 and cladding 119 are composed of materials with an appropriate refractive index differential to provide desired optical characteristics as discussed below. Cladding 119 includes all glass portions (e.g., silica glass) of an optical fiber 130 outside core 115 and is not limited to glass portions of optical fiber 130 outside of core 115 which are optically functional. In some embodiments, the optical fiber 130 may further include a coating layer 171 (e.g., acrylate coating) that surrounds the cladding 119. In some embodiments, the coating layer that surrounds the cladding 119 may be an acrylate polymer material. In further embodiments, the coating layer that surrounds the cladding 119 may be an acrylate polymer material that is different than bonding agent 127.

In some embodiments, optical fiber 130 has a diameter of about 125 microns. In some embodiments, optical fiber 130 has a numerical aperture ranging between 0.1 and 0.6 or between 0.1 and 0.5. In some embodiments, optical fiber 130 has a numerical aperture of about 0.5.

The refractive index of core 115 is higher than the refractive index of the cladding 119 at a wavelength of the beam 201 (FIG. 8). In some embodiments, the cladding 119 may at least partially surround the circumference of the core 115. In some embodiments, the cladding 119 may entirely surround the circumference of the core 115 as shown. In some embodiments, the cladding 119 may be made of a low-index polymer. Examples of low index polymers include fluorinated polymers and silicone based polymers. In some embodiments, cladding 119 can comprise glass. In some embodiments, core 115 may be formed from silica-based glass. However, it should be understood that other embodiments are contemplated and possible, such as embodiments where the core 115 is formed from polymer material.

In some embodiments, core 115 may have a refractive index of greater than or equal to 1.45 at a wavelength of 590 nm. In some embodiments, the core 115 may have a refractive index of greater than or equal to 1.45, greater than or equal to 1.46, or greater than or equal to 1.50 at a wavelength of 590 nm. In some embodiments, core 115 may have a refractive index of from greater than or equal to 1.45 to less than or equal to 1.60, from greater than or equal to 1.45 to less than or equal to 1.50, from greater than or equal to 1.50 to less than or equal to 1.60 at a wavelength of 590 nm.

Exemplary optical fibers may include single-mode fibers, such as SMF-28 Ultra manufactured by Corning Inc., and multimode fibers, such as 50 μm and 62.5 μm multimode fibers manufactured by Corning, Inc.

When optical fiber 130 is inserted into ferrule 120 to form optical fiber connector assembly 100. In some embodiments, optical fiber connector assembly 100 is part of a population of optical fiber assemblies formed by the method outlined herein, wherein the population of optical fiber assemblies has a mean insertion loss of less than or equal to 0.25 dB, between 0.12 dB and 0.25 dB, or less than or equal to 0.12 dB at a reference wavelength of 1310 nm as measured according to Telecordia GR-326. In some embodiments, optical fiber connector assembly 100 has a maximum insertion loss for 97% of samples tested of less than or equal to 0.50 dB, between 0.25 dB and 0.50 dB, or less than or equal to 0.25 dB at a reference wavelength of 1310 nm as measured according to Telecordia GR-326. In some embodiments, optical fiber connector assembly 100 has a fiber retention or pull out force of at least 10 N.

Referring back to FIGS. 13 and 14, ferrule holder 122 includes a ferrule holder window 123 distal to ferrule 120. Stated another way, ferrule holder window 123 is downstream of an end face of ferrule 120. Ferrule holder window 123 provides access to optical fiber 130 that is fed into ferrule 120, and ferrule holder window 123 enables treatment or processing of optical fiber 130 and/or bonding agent 127 prior to being fed into ferrule 120 as discussed in greater detail herein.

Figure 15:
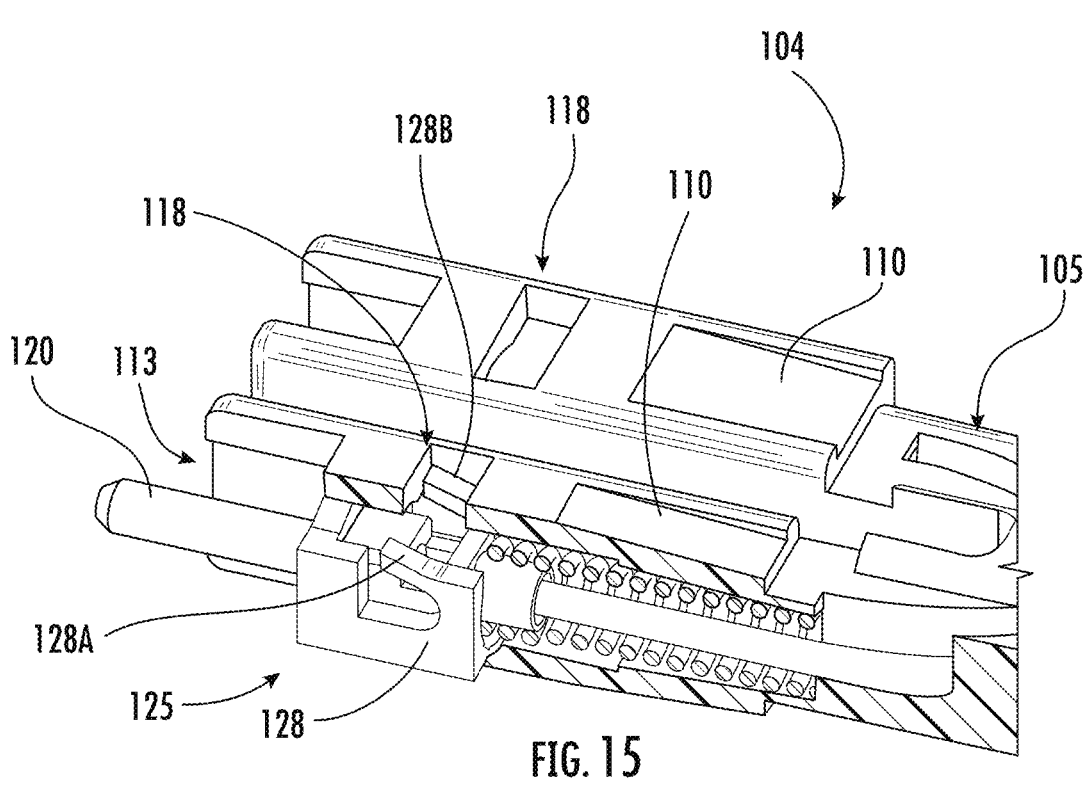
FIG. 15 is a sectional perspective view illustrating the ferrule assembly and the clip carrier of FIG. 14 enclosed within the connector base body.

Referring now to FIG. 14, ferrule assembly 125 is coupled to a clip carrier 128. Clip carrier 128 has latch arms 128A, 128B that engage with internal surfaces of connector base body 104 as shown in at least FIGS. 15 and 16. In particular, latch arms 128A, 128B engage with connector base body 104 (FIGS. 15 and 16) such that window 118 is aligned with ferrule holder window 123 as shown in FIG. 17 thereby enabling treatment or processing of incoming optical fiber 130 as discussed in greater detail herein.

Figures 16, 17, 18:
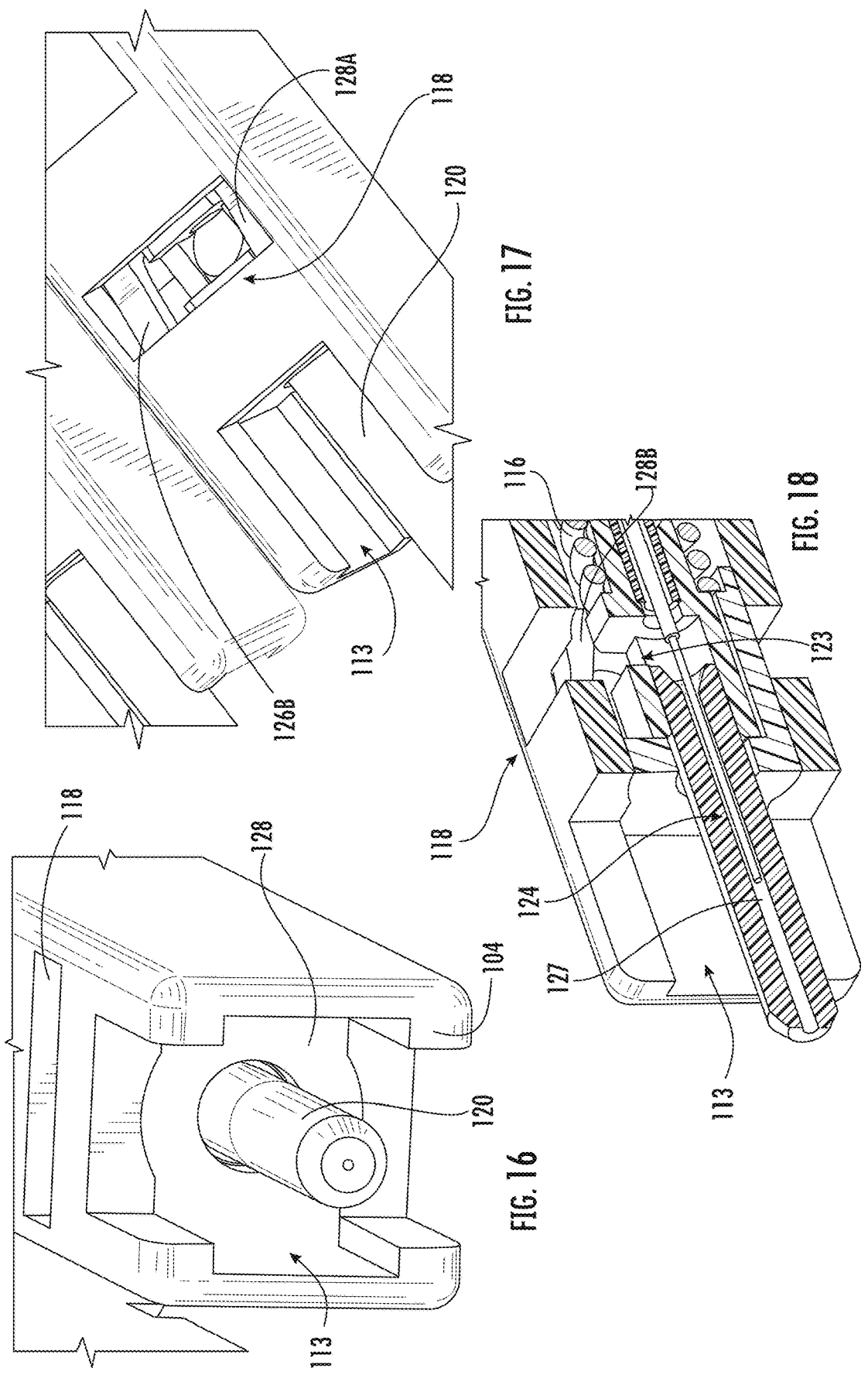
FIG. 16 is a front perspective view of a portion of the connector base body with the ferrule.
FIG. 17 is a perspective view of the connector base body with the ferrule assembly.
FIG. 18 is a sectional perspective view of the connector base body and the ferrule assembly illustrating insertion of an optical fiber within the connector base body and the ferrule assembly.

Referring now to FIG. 18, a schematic of laser treatment of incoming optical fiber 130 is shown. As shown, window 118 provides access to optical fiber 130 such that laser energy 131 can be administered to bonding agent 127 through window 118. In this way, laser energy 131 initiates curing of bonding agent 127 at rear end 143 of ferrule 120. In some embodiments, as discussed below, bonding agent 127 can be inserted adjacent a rear end of ferrule 120 or around a circumference of an optical fiber 130 (FIGS. 19A-19C) such that laser energy 131 can be administered onto bonding agent 127 through window 118 and cure bonding agent 127.

Referring briefly to FIGS. 19A-19C, various examples of disposing bonding agent 127 in ferrule 120 and/or ferrule holder 122 are shown. Referring first to FIG. 19A, bonding agent 127 is injected into ferrule bore 124 through ferrule holder 122. As shown, bonding agent 127 is seated substantially throughout the length of ferrule bore 124 with a portion of bonding agent 127 seated beyond rear end 143 of ferrule 120 When optical fiber 130 is inserted into ferrule holder 122 and ferrule 120, optical fiber 130 is inserted through ferrule holder 122, ferrule 120, and bonding agent 127 such that optical fiber end 159 extends beyond ferrule end face 155 and contacts stopper 208 as discussed herein. In another embodiment, with reference to FIG. 19B, bonding agent 127 is injected through ferrule holder 122 with bonding agent 127 seated beyond rear end 143 of ferrule 120 such that optical fiber end 159 extends beyond ferrule end face 155 and contacts stopper 208 as discussed herein. In this embodiment, optical fiber 130 is inserted through ferrule holder 122, through bonding agent 127, and into ferrule bore 124 with bonding agent 127 on external surface 141 of optical fiber 130. In another embodiment, bonding agent 127 is inserted into ferrule holder 122 where optical fiber 130 is inserted into ferrule holder 122 and ferrule 120 with bonding agent 127 on external surface 141 of optical fiber 130 (as shown in FIG. 19C) such that optical fiber end 159 extends beyond ferrule end face 155 and contacts stopper 208 as discussed herein. In yet another embodiment, as shown in FIG. 19D, bonding agent 127 is applied through ferrule holder window 123 along direction B1. Optical fiber 130 is then inserted into ferrule holder 122 and ferrule 120. When optical fiber 130 is inserted into ferrule holder 122 and ferrule 120, optical fiber 130 is inserted through ferrule holder 122, ferrule 120, and bonding agent 127 such that optical fiber end 159 extends beyond ferrule end face 155.

Bonding agent 127 is configured to couple an optical fiber 130 within ferrule 120 to form a connector assembly 100. In some embodiments, bonding agent 127 comprises a photoactive adhesive. An example photoactive adhesive includes Norland Optical Adhesive (NOA) 86H manufactured by Norland. However, it is within the scope of the present disclosure that in alternate embodiments, other photoactive adhesives may be used, such as Epotek HYB-353ND, Epoxyset UV-8701E, Dymax 9801, for example, or the like. Bonding agent 127 is a low viscosity liquid that can be injected into ferrule bore 124. In some embodiments, bonding agent 127 has a viscosity ranging between 100 cP and 10,000 cP, between 100 cP and 5000 cP, or between 100 cP and 1000 cP at room temperature (about 25° C.). In some embodiments, bonding agent 127 (after the curing time) has a glass transition temperature above 80'C, above 90'C, or above 100'C. In some embodiments, bonding agent 127 (after the curing time) has an elastic modulus of at least 1 GPa.

Bonding agent 127 has a refractive index that is greater than the refractive index of core 115 and cladding 119 of optical fiber 130 so that sufficient light can be extracted from core 115 and cladding 119 to cure bonding agent 127. In some embodiments, bonding agent 127 has a refractive index that is greater than the refractive index of cladding 119 of optical fiber 130 by between 0.04 to 0.12, between 0.04 and 0.11, or between 0.04 to 0.10. The refractive index difference (between bonding agent 127 and cladding 119 of optical fiber 130) of bonding agent 127 being greater than 0.04 may help light leakage from cladding 119 at a distance of between 10 mm and 15 mm within ferrule bore 124 as measured from a front surface of ferrule 120 (or front end 153 of ferrule 120), and the refractive index difference (between bonding agent 127 and cladding 119 of optical fiber 130) of bonding agent 127 being 0.12 or less, or even 0.10 or less, helps ensure that enough light will reach a back end of connector 10 (greater refractive index differences may result in too much light being extracted at a short distance within ferrule bore 124).

Bonding agent 127 can cure in different ways. In one embodiment, bonding agent can be cured by beam 201 (FIG. 22) having a wavelength ranging between 315 nm and 450 nm, between 315 nm and 425 nm, or between 315 nm and 420 nm. In another embodiment, bonding agent 127 at rear end 143 is cured by laser energy 131 having a wavelength ranging between 315 nm and 450 nm, between 315 nm and 425 nm, or between 315 nm and 420 nm. In some embodiments, bonding agent 127 is cured by combining the above mentioned light treatments. For example, in some embodiments and as described herein, curing of bonding agent 127 is initiated by a beam 201 applied onto bonding agent 127 having a wavelength between 315 nm and 450 nm with laser energy 131 applied onto bonding agent 127 at rear end 143 of ferrule 120 having a wavelength between 315 nm and 450 nm. In this embodiment, curing time is less than 1 minute. In some embodiments, the curing time is about 5 seconds.

As mentioned previously, in some embodiments, ferrule 120 does not include bonding agent 127 within internal bore 124. In such embodiments, optical fiber 130 (FIG. 14B) is inserted directly into ferrule 120 through internal bore 124 such that at least a portion of optical fiber 130 protrudes outwardly from front end of ferrule 120.

Rear end 116 of connector base body 104 is configured to receive crimp band 106. In a manner not shown herein, a fiber optic cable providing optical fiber 130 (FIG. 18) also includes one or more layers of material (e.g., strength layer of aramid yarn) that may be crimped onto rear end 116 of connector base body 104. A crimp band (or "crimp ring") 106 may be provided for this purpose. Additionally, a strain-relieving boot (e.g., boot assembly 108) may be placed over the crimped region and extend rearwardly to cover a portion of the fiber optic cable. Variations of these aspects will be appreciated by persons familiar with the design of fiber optic cable assemblies. For example, other ways of securing a fiber optic cable to connector base body 104 are also known and may be employed in some embodiments.

Boot assembly 108 is shown in FIGS. 19 and 20 and is configured to limit radial movement of optical fiber cable and to actuate latch 102 during assembly or disassembly of optical fiber connector assembly 100. Boot assembly 108 includes head portion 109 and a tail portion 111 that are coupled together. In some embodiments, head portion 109 is coupled to tail portion 111 in a snap fit configuration. In an alternate embodiment, boot assembly 108 could be constructed as an elastomer overmolded onto a boot assembly substrate. However, it is contemplated that in other alternate embodiments, alternate coupling configurations may be used. Boot assembly 108 provides a push pull user experience when assembling and disassembling connector 101 as discussed in greater detail herein. As shown, boot assembly 108 also includes an aperture 132 to receive rear protrusion 134 of latch 102 as discussed in greater detail herein. In addition, boot assembly 108 provides an advantage of being spatially efficient thereby enabling a high packing density of optical fiber connector assemblies 100 in certain applications (e.g., data centers, etc.).

Additional details regarding connector assembly 100 can be found in U.S. Patent Application No. 63/155,461 filed on Mar. 2, 2021, the disclosure of which is hereby incorporated by reference.

Figures 24, 25:
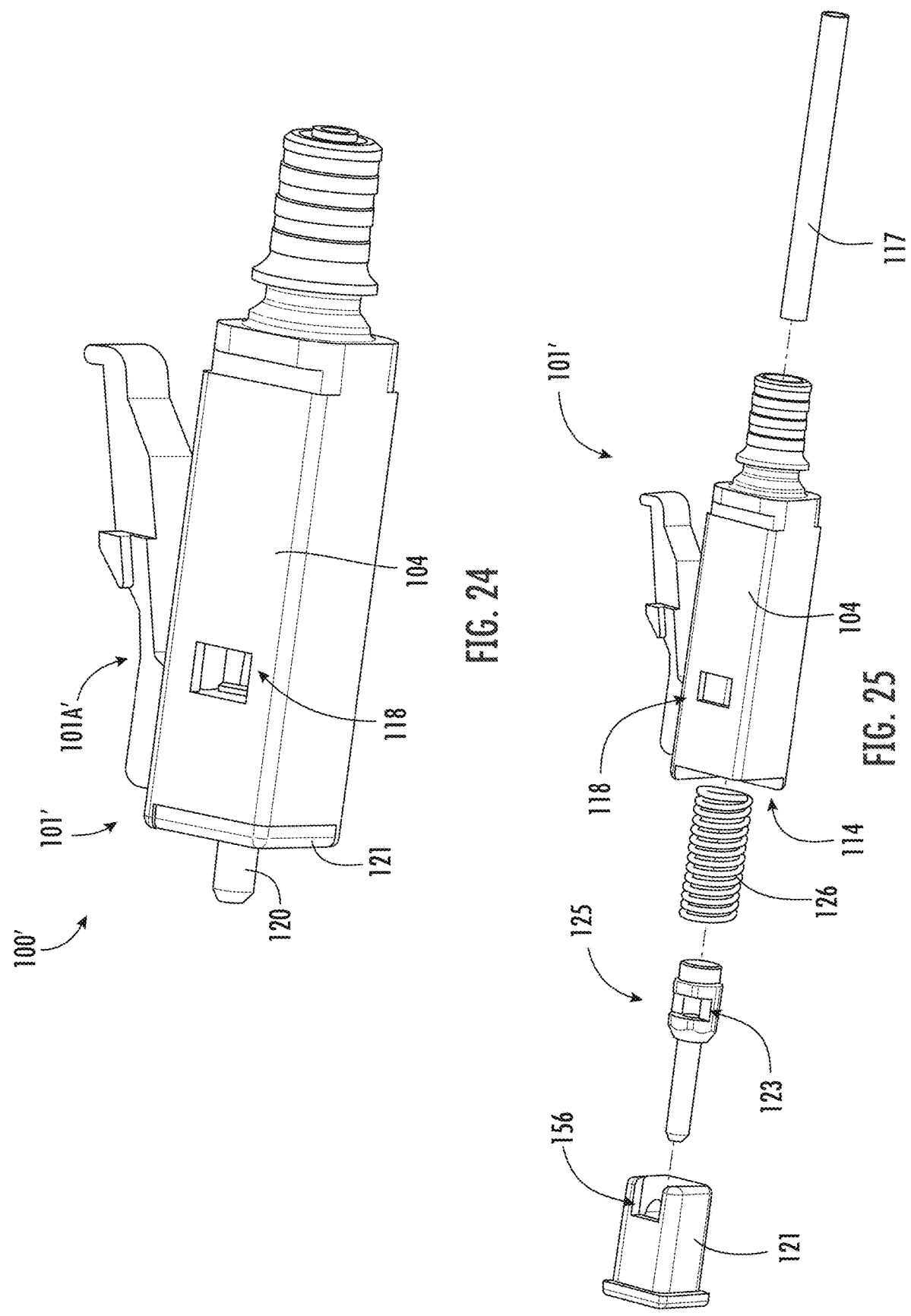
FIG. 24 is a perspective view of another fiber optic connector.
FIG. 25 is an exploded view of the fiber optic connector of FIG. 24.

Referring now to FIGS. 24 and 25, an alternate optical fiber connector assembly 100' is shown. In particular, optical fiber assembly 100' is an LC simplex connector type. As shown, optical fiber assembly 100' is similar to optical fiber assembly 100 described above, and similar components between the assemblies will have the same reference numbers to facilitate discussion herein. Stated another way, optical fiber assembly 100' and optical fiber assembly 100 are the same except as noted herein.

Optical fiber assembly 100' comprises an optical fiber connector 101' with a single fiber optic connector assembly 101A'. As shown in FIGS. 24 and 25, optical fiber connector 101' includes a clip 121, ferrule assembly 125, connector base body 104, and a lead in tube 117.

Figures 26A, 26B, 26C:
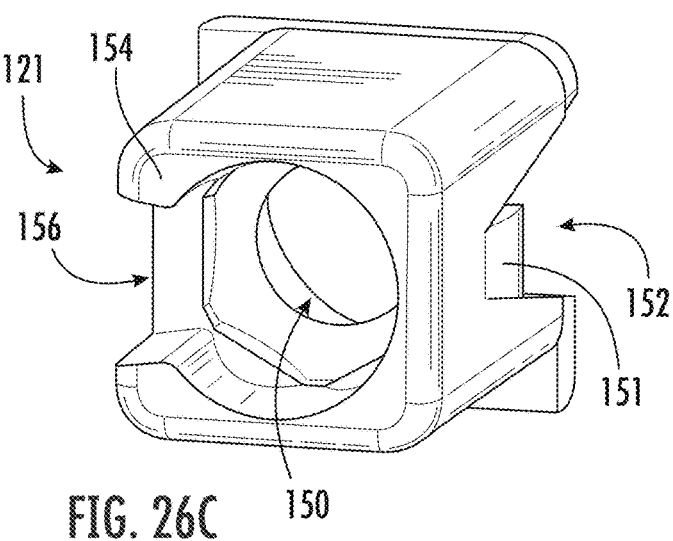
FIGS. 26A-26C are perspective views of a clip of the fiber optic connector of FIG. 24.

Referring now to FIGS. 26A-26C, various views of clip 121 are shown. Clip 121 couples to front end 114 (FIG. 25) of connector base body 104 such that clip 121 is contoured to the shape of connector base body 104. As shown, clip 121 includes an aperture 150 that defines and extends passages through which ferrule 120 extends when connector 101' is assembled. Clip 121 also includes a latch 151, a tapered slot 152, a frontal flange 154, and a window element 156.

Latch 151 is configured to engage with connector base body 104 to hold clip 121 in place within connector 101'. Adjacent to latch 151 is tapered slot 152. Tapered slot 152 comprises a slot that is tapered from a front end of clip 121. Stated another way, slot 152 is tapered such that the width of slot 152 decreases from a front end of clip 121. Tapered slot 152 provides assembly orientation information to a user such that clip 121 is inserted correctly into connector base body 104 during assembly.

On a front end of clip 121, frontal flange 154 is provided where frontal flange 154 is an asymmetrical shape. By being asymmetrical, frontal flange also provides orientation information to a user such that clip 121 is inserted correctly in the proper orientation into connector base body 104 during assembly.

Opposite latch 151 is a window element 156. As shown in FIG. 24, window element 156 aligns with window 118 of connector base body 104 and ferrule holder window 123 to provide access into ferrule assembly 125 as discussed herein.

Method of Assembling Optical Fiber Connector Assembly 100

To assemble optical fiber connector assembly 100 and optical fiber connector 101, optical fiber(s) 130 and ferrule assembly 125 are inserted into connector base body 104 as shown in at least FIG. 11. Then, crimp band 106 is applied onto rear end 116 of connector base body 104. Latch 102 is then applied onto connector base body 104 from front end 114 such that retention protrusion 138 of each latch arm 102A, 102B engage with a corresponding arm of connector base body 104, and guide bodies 139 are received into recesses 113 of connector base body 104 such that guide bodies 139 mesh and/or contact with front end 114 of connector base body 104. In some embodiments, retention protrusion 138 engages with window 118 of connector base body 104. Boot assembly 108 is then applied onto connector base body 104 from rear end 116 so that rear protrusion engages with cut out 107 of boot assembly 108.

Method of Curing Bonding Agent 127

Figure 22:
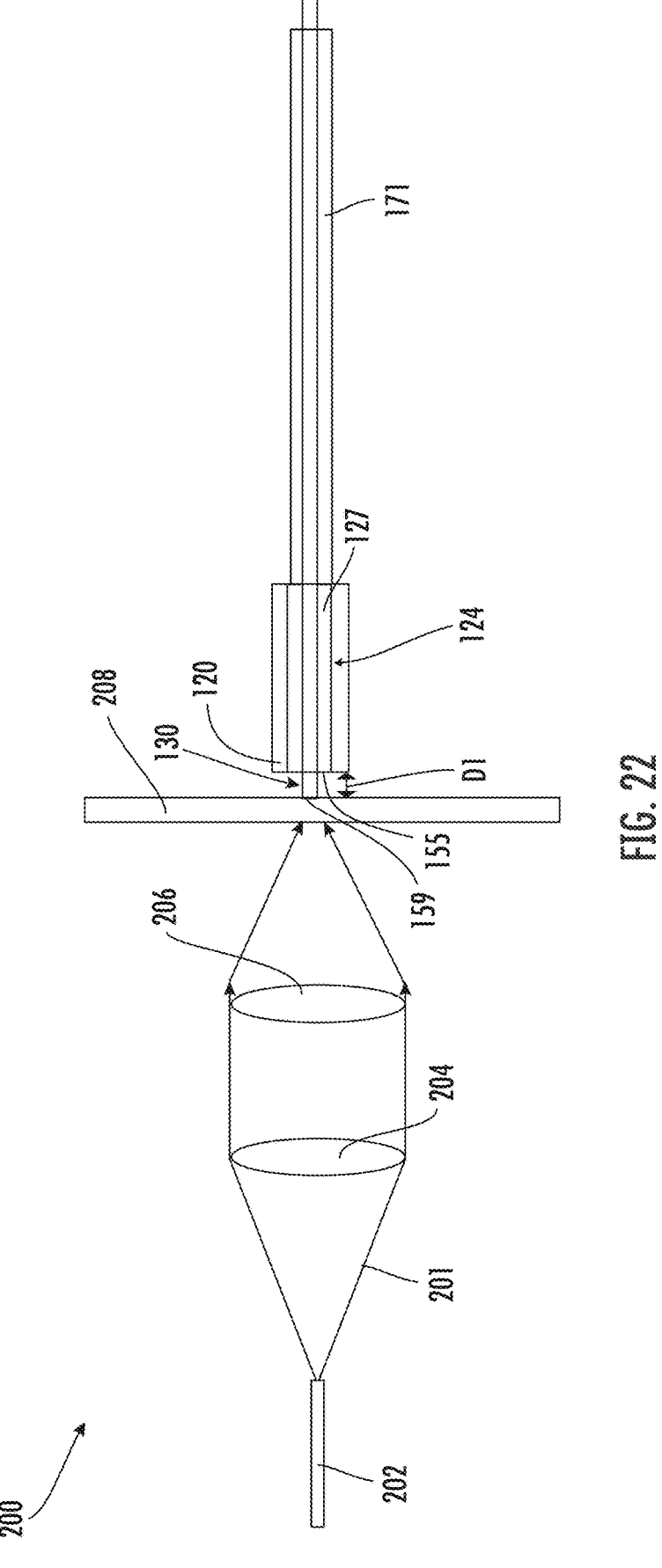
FIG. 22 is a schematic of a laser apparatus used in accordance with the present disclosure.

Referring now to FIG. 22, a laser apparatus 200 is shown. Laser apparatus 200 is configured to laser treat optical fiber connector assembly 100 discussed above and to cure bonding agent 127. As mentioned previously in relation to FIGS. 19A-19D, bonding agent 127 is inserted into ferrule 120 and ferrule holder 122 prior to insertion of optical fiber 130 and prior to treatment by laser apparatus 200.

The laser apparatus 200 is configured to cure bonding agent 127 and includes a laser 202, a lenses 204, 206, and optionally, a stopper 208. As shown in FIG. 22, laser 202 emits beam 201 onto optical fiber end 159. In some embodiments, beam 201 has a wavelength in the range of 300 nm and 450 nm, 315 nm and 425 nm, or 315 nm and 420 nm. In one embodiment, beam 201 has a wavelength of about 405 nm. In some embodiments, laser 202 emits laser beam 201 that is a continuous wave (CW wave). In some embodiments, laser 202 emits laser beam pulses at a pulse width 1 ns and 30 ns. In some other embodiments, laser 202 emits laser beam pulses at a pulse width between 0.2 picoseconds (ps) and 20 ps, 3 ps and 17 ps, or 5 ps and 15 ps. In some embodiments, laser 202 emits beam 201 at a repetition rate ranging between 1 kilohertz (kHz) and 100 kHz, 20 kHz and 85 kHz, or 25 kHz and 75 kHz. In one embodiment, laser 202 emits beam 201 at a repetition rate of 50 kHz. In some embodiments, laser 202 emits laser beam 201 at an output power ranging between 100 mW and 1000 mW, between 200 mW and 800 mW, or between 400 mW and 700 mW. In one embodiment, laser 202 emits beam 201 at an output power of 600 mW with CW wave output from a laser diode. In some embodiments, laser 202 of laser apparatus 200 laser treats one optical fiber connector assembly 100. In some embodiments, laser 202 of laser apparatus 100 laser treats multiple optical fiber connector assemblies 100 with a single laser 202.

In embodiments, the beam 201 may have an intensity of from greater than or equal to 0.1 W/cm2 to less than or equal to 80000 W/cm2 as applied onto fiber end 159 of optical fiber 130. In embodiments, the beam 201 may have an intensity of from greater than or equal to 0.1 W/cm2 to less than or equal to 6000 W/cm2, from greater than or equal to 0.1 W/cm2 to less than or equal to 5000 W/cm2, from greater than or equal to 0.1 W/cm2 to less than or equal to 4000 W/cm2, from greater than or equal to 0.1 W/cm2 to less than or equal to 300 W/cm2, from greater than or equal to 0.1 W/cm2 to less than or equal to 2000 W/cm2, from greater than or equal to 0.1 W/cm2 to from less than or equal to 1000 W/cm2.

When beam 201 is emitted, beam 201 travels through laser apparatus 100 onto optical fiber connector assembly 100. In particular, beam 201 contacts bonding agent 127 and optical fiber 130. Beam 201 initiates curing of bonding agent 127 due to refraction of beam 201 resulting from the refractive index difference between bonding agent 127 and optical fiber 130.

Lenses 204, 206 are configured to redirect and focus beam 201 onto fiber end 159 of optical fiber 130 through stopper 208. In some embodiments, lens 204 is a collimating lens and lens 206 is a long working distance lens. However, it is contemplated that in alternate embodiments, alternate lenses and/or alternate series/configurations of lenses 204, 206 may be used to redirect and focus beam 201 onto fiber end 159 of optical fiber 130 through stopper 208. In some embodiments, lenses 204, 206 have numerical apertures ranging between 0.05 and 0.4, between 0.1 and 0.3, or between 0.15 and 0.25.

Stopper 208 is configured to further focus beam 201 from lenses 204, 206 onto fiber end 159 of optical fiber 130. Advantageously, stopper 208 provides a reference structure form which fiber end 159 of optical fiber 130 is positions. This enables repeatable positioning of fiber end 159 of optical fiber 130 such that fiber end 159 is positioned at a focusing position of lens 206 (i.e., the focus of lens 206). In addition, stopper 208 positions optical fiber 130 (by contacting fiber end 159) once optical fiber 130 is inserted into ferrule 120 such that fiber end 159 aligns with beam 201 emitted by laser 202. In some embodiments, stopper 208 is made of glass. However, it is contemplated that in alternate embodiments, other suitable materials may be used for stopper 208. As shown in FIG. 22, stopper 208 is spaced from ferrule end face 155 by a spacing distance D1. In some embodiments, spacing distance D1 ranges between 0.1 mm and 2 mm, between 0.5 mm and 1.5 mm, or between 0.7 mm and 1.2 mm.

As discussed herein, optical fiber 130 is inserted into ferrule 120 such that bonding agent 127 contacts inner wall 135 of ferrule 120 and external surface 141 of optical fiber 130.

To assemble an optical fiber connector assembly 100 and optical fiber connector 101, a method 300 is shown in FIG. 23. Method 300 begins at step 301 where a ferrule 120 is provided. Then, a bonding agent 127 is loaded/inserted into ferrule 120 at step 303 as discussed above with reference to FIGS. 19A-19C. Then, at step 305, optical fiber 130 is inserted into ferrule bore 124 of ferrule 120 where optical fiber 130 is inserted into ferrule 120 such that fiber end 159 contacts stopper 208. In some embodiments, insertion distance of optical fiber 130 is controlled by controlling fiber insertion distance by other suitable methods. Upon insertion of optical fiber 130, beam 201 is emitted by laser 202 of laser apparatus 200 onto optical fiber 130 to initiate curing of bonding agent 127 in step 307. Then, at step 309, laser energy 131 is emitted through window 118 to also initiate curing of bonding agent 127 at rear end 143 of ferrule 120. As mentioned previously, in some embodiments, steps 307 and 309 are performed simultaneously. However, in other embodiments, steps 307 and 309 are performed sequentially. Advantageously, laser apparatus 200 and the corresponding method 300 can cure bonding agent 127 of optical fiber assembly 100 without the need of additional heat (e.g., with the use of a heating sleeve). Simultaneous execution of steps 307 and 309 and removal of an additional heating step can reduce cycle time of method 300.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A method of assembling an optical fiber assembly, wherein the optical fiber assembly includes a ferrule assembly comprising a ferrule coupled to a ferrule holder, the ferrule having a front end, a rear end, and a ferrule bore extending between the front and rear ends, the method comprising:

disposing a bonding agent into the ferrule bore;
    wherein the bonding agent has a viscosity ranging between 100 cP and 10000 cP at a temperature of about 25° C. and a reference curing time of less than 1 minute;
inserting an optical fiber into the ferrule bore and through the bonding agent, wherein at least some of the bonding agent surrounds the optical fiber proximate the rear end of the ferrule holder;
emitting a laser beam through a window of the ferrule holder and onto the bonding agent proximate the rear end of the ferrule, wherein the window provides access to the inserted optical fiber; and
emitting a light onto the optical fiber, wherein emitting the light and emitting the laser beam cause between 75% and 85% of the bonding agent in the ferrule to cure and thereby form the optical fiber assembly, and wherein emitting the light includes using a laser emitting a beam at a power ranging between 100 mW and 1000 mW and a wavelength ranging between 315 nm and 450 nm, wherein emitting the laser beam is conducted simultaneously with emitting the light to cure the same bonding agent, and
    wherein emitting the laser beam is distinct from emitting the light.

2. The method of claim 1, wherein the emitting steps cause the between 75% and 85% of the bonding agent to cure in about 5 seconds or less.

3. The method of claim 1, wherein the emitting a light step includes using a laser apparatus to emit the laser beam, the laser apparatus comprising:

a laser having a power output ranging between 100 mW and 1000 mW and a wavelength ranging between 300 nm and 450 nm;
a plurality of lenses directing the laser beam emitted by the laser onto the optical fiber inserted into the ferrule.

4. The method of claim 3, wherein the laser apparatus further includes a glass stopper spaced apart from an end face of the ferrule by a spacing distance ranging between 0.1 mm and 2 mm.

5. The method of claim 1, wherein the optical fiber assembly is part of a population of optical fiber assemblies formed by the same steps, and wherein the population of optical fiber assemblies has a mean insertion loss of less than or equal to 0.25 dB at a reference wavelength of 1310 nm.

6. The method of claim 1, wherein the optical fiber comprises a cladding having a refractive index, wherein the bonding agent has a refractive index, and wherein a difference between the refractive index of the bonding agent and the refractive index of the cladding is between 0.04 and 0.12.

7. The method of claim 6, wherein the difference between the refractive index of the bonding agent and the refractive index of the cladding is between 0.04 and 0.10.

* * * * *